United States Patent
Dotsubo et al.

(10) Patent No.: US 7,050,095 B2
(45) Date of Patent: *May 23, 2006

(54) METHOD AND APPARATUS FOR IMAGE PROCESSING USING A TEMPLATE IMAGE

(75) Inventors: Nobuhide Dotsubo, Daito (JP); Akira Toba, Osaka (JP); Toshinobu Haruki, Kyotanabe (JP); Ko Yokokawa, Chofu (JP); Toshiyuki Toyofuku, Hachioji (JP)

(73) Assignees: Sanyo Electric Co., Ltd., Moriguchi (JP); Olympus Optical Co., Ltd., Tokyo (JP)

(*) Notice: Subject to any disclaimer, the term of this patent is extended or adjusted under 35 U.S.C. 154(b) by 652 days.

This patent is subject to a terminal disclaimer.

(21) Appl. No.: 10/131,481

(22) Filed: Apr. 25, 2002

(65) Prior Publication Data

US 2002/0122118 A1 Sep. 5, 2002

Related U.S. Application Data

(62) Division of application No. 09/096,460, filed on Jun. 11, 1998, now Pat. No. 6,441,850.

(30) Foreign Application Priority Data

Jun. 13, 1997 (JP) .................................. 9-157161

(51) Int. Cl.
*H04N 5/228* (2006.01)
*H04N 5/262* (2006.01)
*H04N 9/74* (2006.01)
*G06K 9/62* (2006.01)

(52) U.S. Cl. .................. 348/222.1; 348/239; 348/586; 382/209

(58) Field of Classification Search ................ 348/169, 348/218.1, 222.1, 231.6, 239, 586, 598, 254; 382/209, 217, 233, 254, 248, 274, 284; 358/909.1, 358/450

See application file for complete search history.

(56) References Cited

U.S. PATENT DOCUMENTS

| | | | |
|---|---|---|---|
| 5,126,847 A * | 6/1992 | Kori et al. .................. 348/239 |
| 5,335,016 A | 8/1994 | Nakagawa | |
| 5,477,264 A * | 12/1995 | Sarbadhikari et al. ... 348/231.6 |
| 5,724,456 A | 3/1998 | Boyack et al. | |
| 5,914,748 A | 6/1999 | Parulski et al. | |
| 5,933,137 A | 8/1999 | Anderson | |
| 6,137,919 A | 10/2000 | Gonsalves et al. | |
| 6,151,421 A | 11/2000 | Yamada | |
| 6,222,637 B1 | 4/2001 | Ito et al. | |
| 6,441,850 B1 * | 8/2002 | Dotsubo et al. ............ 348/239 |
| 6,525,836 B1 * | 2/2003 | Ito et al. ..................... 358/450 |
| 6,587,599 B1 * | 7/2003 | Huang ........................ 382/284 |

FOREIGN PATENT DOCUMENTS

JP 06-237431 8/1994

* cited by examiner

*Primary Examiner*—Ngoc-Yen Vu
*Assistant Examiner*—Luong T. Nguyen
(74) *Attorney, Agent, or Firm*—Armstrong, Kratz, Quintos, Hanson & Brooks, LLP

(57) ABSTRACT

A digital camera includes a memory card. The memory card is previously recorded with template image data that has been subjected to conversion of Y-data effective range and JPEG compressing. A CPU expands this template image data by a JPEG method, and then subjects only expanded data greater than a predetermined value to effective-range conversion that is reverse to the above. The CPU composites the template image data thus obtained with photographed image data, thereby creating composite image data.

8 Claims, 6 Drawing Sheets

(A)

(B)

(C)

METHOD AND APPARATUS FOR IMAGE PROCESSING USING A TEMPLATE IMAGE

This is a division of Ser. No. 09/096,460, filed Jun. 11, 1998 now U.S. Pat. No. 6,441,850.

BACKGROUND OF THE INVENTION

1. Field of the Invention

This invention relates to a method of compositing a template image data with a photographed image as well as a digital camera, and more particularly to a template/photographed image compositing method and digital camera arranged to read the template image data that has been compressed by a JPEG method and previously recorded in a memory card so that the template image data is read out of the memory card and expanded for compositing with photographed image data.

This invention also relates to a method and apparatus of recording a template image, and more particularly to a template image recording method and apparatus adapted to record template image data into a memory card through compression.

2. Description of the Related Art

In a conventional digital camera, template image data is previously recorded in a memory card. An operator can create a composite image of a template image with a photographed image by desirably selecting a template image.

However, the template image data is recorded in the memory card in a state of compression according to a JPEG method. There has been a problem in that the template image data after expansion contains noise resulting from errors induced between compression and expansion of the data, resulting in a problem that noise occurs in the composite image.

SUMMARY OF THE INVENTION

Therefore, it is a primary object of this invention to provide a method of compositing a template image with a photographed image as well as a digital camera which can improve the image quality of a composite image.

It is another object of this invention to provide a template image recording method and a template image recording apparatus which can prevent noise from occurring.

This invention is a method of compositing a template image with a photographed image, comprising the steps of: (a) preparing a recording medium for holding third template image data created by converting first template image data into second template image data by a first converting method and compressing the second template image data by a predetermined compressing method; (b) expanding the third template image data by a predetermined expanding method to create fourth template image data; (c) converting the fourth template image data having a data value in a first determined range into fifth template image data by a second converting method; and (d) compositing the fifth template image data with the photographed image data.

The third template image data held in the recording medium is data that is created by converting first template image data into second template image data by a first converting method and compressing the second template image data by a predetermined compressing method. The third template image data reproduced out of the memory medium is expanded by a predetermined expanding method to thereby create the forth template image data. The fourth template image data having a data value in a first determined range only is converted into fifth template image data by a second converting method. The fifth template image data is composited with the photographed image data.

In one embodiment of this invention, data having a data value in a second predetermined range is converted by a first converting method into data having a data value in a third predetermined range smaller than the second predetermined range, while data having a data value in the third predetermined range is converted by a second converting method into data having a data value in the second predetermined range.

In another embodiment of this invention, the second predetermined range includes the first predetermined range, and the first predetermined range including the third predetermined range.

In one aspect of this invention, the first template image data includes at least one image-quality-related data component, and the second template image being created by converting the image-quality-related data component by the first converting method. The step (c) includes a step of comparing the image-quality-related data component contained in the fourth template image data with a predetermined value, and a step of converting the fourth template image data including the image-quality-related data component greater than the predetermined value into the fifth template image data.

According to this invention, the fourth template image data included in the first predetermined range is converted by a second converting method into the fifth template image data. It is therefore possible to remove away noises due to errors induced between compression and expansion, thereby improving the image quality of a composite image.

This invention is a method of recording a template image, comprising the steps of: (a) converting first template image data by a predetermined converting method to create second template image data; (b) compressing the second template image data by a predetermined compressing method to create third template image data; and (c) recording the third template image data into a recording medium.

The second template image data is created by converting the first template image data by a predetermined converting method, while the third template image data is created by compressing the second template image data by a predetermined compressing method. The third template image data thus created is recorded in the memory medium such as a memory card.

According to this invention, the template image data, that has been converted by the predetermined converting method and compressed by a predetermined compressing method, is recorded in the memory medium. This makes possible to remove noises during reproduction.

This is a digital camera, comprises: a recording medium for holding third template image data created by converting first template image data into second template image data by a first converting method and compressing the second template image data by a predetermined compressing method; a creating means for creating fourth template image data by expanding the third template image data by a predetermined expanding method; a converting means for converting the fourth template image data having a data value in a first predetermined range into fifth template image data by a second converting method; and a compositing means for compositing the fifth template image data with photographed image data.

The third template image data held in the recording medium is data that is created by converting first template image data into second template image data by a first converting method and compressing the second template image data by a predetermined compressing method. The third template image data reproduced out of the memory medium is expanded by a predetermined expanding method to thereby create the forth template image data. The fourth template image data having a data value in a first determined range only is converted into fifth template image data by a second converting method. The fifth template image data is composited with the photographed image data.

According to this invention, the fourth template image data included in the first predetermined range is converted by a second converting method into the fifth template image data. It is therefore possible to remove away noises due to errors induced between compression and expansion, thereby improving the image quality of a composite image.

This invention is a template image recording apparatus, comprising: a creating means for creating second template image data by converting template image data by a predetermined converting method; a creating means for creating third template image data by compressing second template image data by a predetermined compressing method; and a recording means for recording the third template image data into a recording medium.

The second template image data is created by converting the first template image data by a predetermined converting method, while the third template image data is created by compressing the second template image data by a predetermined compressing method. The third template image data thus created is recorded in the memory medium such as a memory card.

According to this invention, the template image data, that has been converted by the predetermined converting method and compressed by the predetermined compressing method, is recorded in the recording medium. Noises can be removed away during reproduction.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
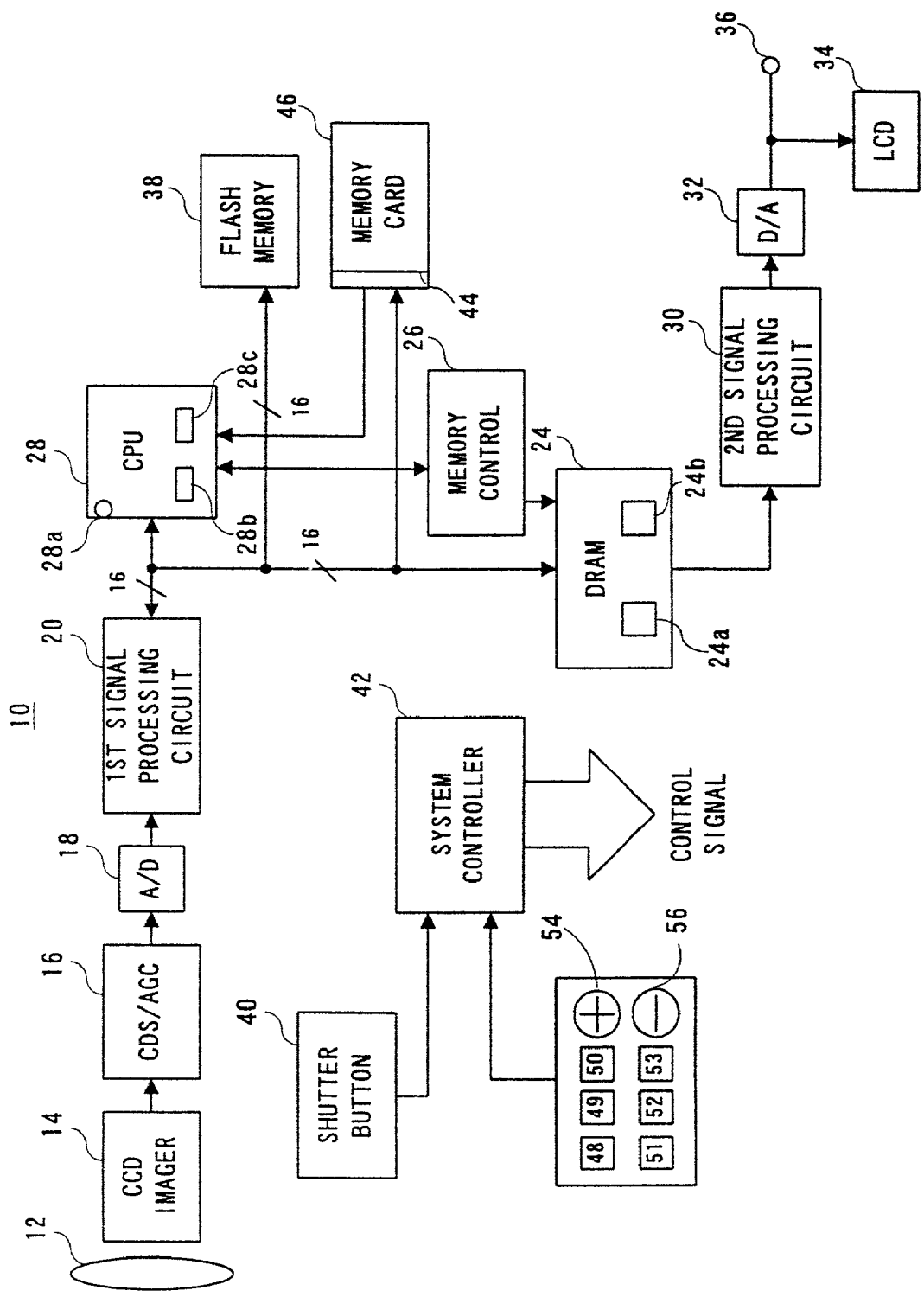
FIG. 1 is a block diagram showing one embodiment of this invention.

Referring to FIG. 1, a digital camera 10 of this embodiment includes a lens 12. An optical image incident upon this lens 12 is given to a CCD imager 14 through a color filter having $C_y$, $Y_e$, $M_g$ and G arranged in a mosaic form.

When outputting a motion picture through a monitor 34, the CCD imager 14 performs so-called well-known pixel mixing readout to supply a resulting pixel signal to a CDS/AGC circuit 16. The CDS/AGC circuit 16 performs well-known noise removal and level adjustment on the inputted pixel signal. The pixel signal processed by this CDS/AGC circuit 16 is then converted by an A/D converter 18 into digital data, i.e. pixel data. A first signal processing circuit 20 receives the pixel data outputted from the A/D converter 18 to calculate luminance data (Y data) and color-difference data (U data and V data). Upon creating Y data, the inputted pixel data is averaged according to Equation 1.

For a line (H1+H2)

$$Y=\{(Mg+Ye)+(G+Cy)\}/2=\{(R+B+R+G)+(G+B+G)\}/2=(2R+3G+2B)/2 \quad \text{[Equation 1]}$$

For a line (H3+H4)

$$Y=\{(G+Ye)+(Mg+Cy)\}/2=\{(G+G+R)+(R+B+B+G)\}/2=(2R+3G+2B)/2$$

where, Mg=R+B, Ye=R+G, and Cy=B+G

Since the Y data is proportional to 2R+3G+2B, the component B is reproduced brighter than the y data (=0.3R+0.59G+0.11B) specified by the NTSC standard. This, however, raises no practical problem.

Meanwhile, when creating U data and V data, the first signal processing circuit 20 performs subtraction between adjacent pixels according to Equation 2.

For the line (H1+H2)

$$U=\{(Mg+Ye)-(G+Cy)\}=\{(R+B+R+G)-(G+B+G)\}=2R-G \quad \text{[Equation 2]}$$

For the line (H3+H4)

$$V=\{(G+Ye)-(Mg+Cy)\}=\{(G+G+R)+(R+B+B+G)\}=G-2B$$

where, Mg=R+B, Ye=R+G, and Cy=B+G

However, the color-difference data is available only every other line. Accordingly, the first signal processing circuit 20 supplements for deficient color-difference data on a current line by using the color difference data on the preceding line. That is, V data only is available on a line (H3+H4) so that the U data on a line (H1+H2) is utilized for the U data for the line (H3+H4).

The Y, U and V data thus created are written by a memory control circuit 26 into a memory area 24a of a DRAM 24, and are thereafter outputted to a second signal processing circuit 30. The second signal processing circuit 30, when outputting a motion picture, performs predetermined horizontal and vertical interpolations on the Y, U and V data (motion picture data) from the DRAM 24 so that these data become suited for a display-screen size of an LCD 34. The motion picture data, supplied from the second signal processing circuit 30, is converted by a D/A converter 32 into an analog signal. This analog signal is supplied to the LCD 34, and also outputted through an output terminal 36. As a result, a motion picture is outputted through the LCD 34.

When an operator depresses the shutter button 40, a system controller 42 controls the CCD imager 14 so as to perform so-called all-pixel readout. Due to this, the CCD imager 14 outputs pixel signals at every other line. Since the CCD imager 14 is mounted with a color filter in a mosaic form, $C_y$ and $Y_e$ are alternately outputted at an odd line, while $M_g$ and G are alternately outputted at an even line. The CDS/AGC circuit 16 performs noise removal and level adjustment on the pixel signal, similarly to the above. The A/D converter 18 converts the pixel signal from the CDS/

AGC circuit 16 into digital data, i.e. pixel data. The CCD imager 14 is disabled after outputting 1 frame of pixel signals. The 1-frame pixel data outputted from the A/D converter 18 is directly delivered onto a bus 22 without processed by the first signal processing circuit 20. The pixel data is written into the memory area 24a by the memory control circuit 26.

The CPU 28 converts the pixel data of the memory area 24a into Y (=Y.sub.2), U and V data, according to Equation 3 to Equation 5, with using a working area 24b. The converted Y, U and V data, i.e. photographed image data, are compressed according to a JPEG format, and written into a memory card 46.

$$Y_h = C_y + Y_e + M_g + G$$

$$C_b = (C_y + M_g) - (Y_e + G)$$

$$C_r = (Y_e + M_g) - (C_y + G) \quad \text{[Equation 3]}$$

$$R = k_{11} \times Y_h + k_{12} \times C_b + k_{13} \times C_r$$

$$G = k_{21} \times Y_h + k_{22} \times C_b + k_{23} \times C_r$$

$$B = k_{31} \times Y_h + k_{32} \times C_b + k_{33} \times C_r \quad \text{[Equation 4]}$$

$$Y_L = 0.299 \times R + 0.587 \times G + 0.114 \times B$$

$$U = B - Y_L$$

$$V = R - Y_L \quad \text{[Equation 5]}$$

Due to the color separation and YUV conversion as stated above, adjacent 4 (2 ×2) pixels of $C_y$, $M_g$, $Y_e$ and G data are used to create 1-pixel Y, U and V data of the 4 pixels, thereby providing Y, U and V data for all the pixels.

The memory control circuit 26 reads $Y_e, C_y, M_g$ and G pixel data on a line-by-line basis out of the memory area 24a, and supplies them to the second signal processing circuit 30. The second signal processing circuit 30, when outputting a photographed image, performs color separation and YUV-conversion on the pixel data according to Equation 3 to Equation 5, thereby outputting a photographed image (freeze image) on the LCD 34.

If the operator depresses a reproduced button 52, the CPU 28 reads desired compressed data out of a memory card 46, and expands the compressed data with using a working area 24b. The expanded image data (YUV data) is stored in the memory area 24a, and read out later. The second signal processing circuit 30, in a reproducing mode, performs horizontal and vertical interpolations on the image data. This allows a reproduced image to be displayed on the LCD 34.

Figure 2:
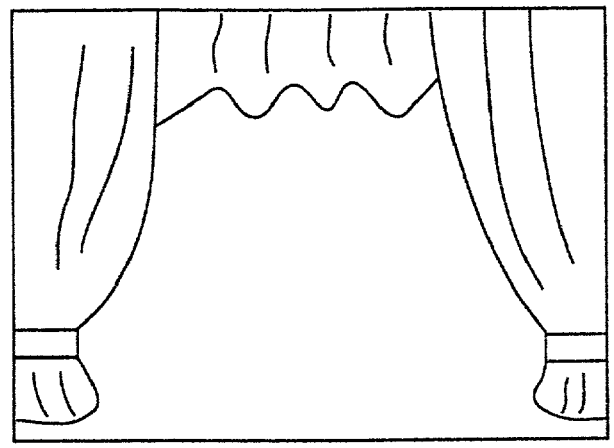
FIG. 2(A) is an illustrative view showing one example of a template image, FIG. 2(B) an illustrative view showing one example of a photographed image, and FIG. 2(C) an illustrative view showing one example of a composite image.
Figure 2:
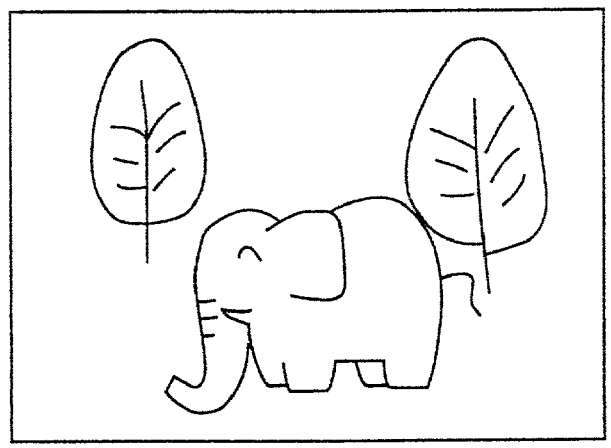
Figure 2:
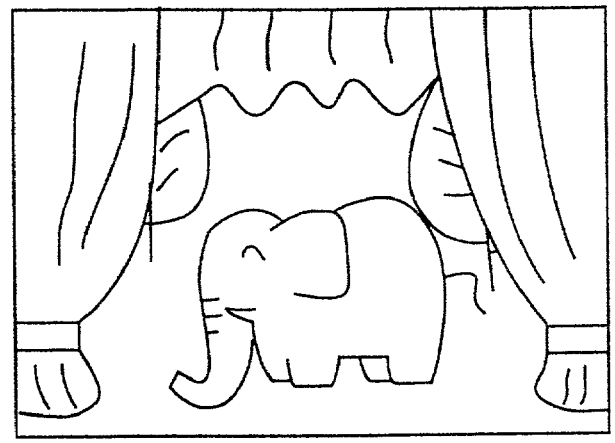

The memory card 46 may use, for example, a template card that has a template image previously prepared as shown in FIG. 2(A) and a template code written therewith. With such a card, the operator can set either one of a normal reproducing mode or a card-function reproducing mode by operating a reproducing mode setting button 48.

In the normal reproducing mode, if the operator manipulates a + button 54 or − button 56, any one of image data that has been recorded in the memory card 46 is read out. Thus, a reproduced image is displayed on the LCD 34, similarly to the above. That is, if a template image shown in FIG. 2(A) and a photographed image shown in FIG. 2(B) are recorded in the memory card 46, then either one of the images will be outputted through the LCD 34.

Where the card-function reproducing mode is set, if the operator operates the + button 54, the − button 56 and the selecting button 50, an image composited by the template image and the photographed image can be created as shown in FIG. 2(C).

Figure 3:
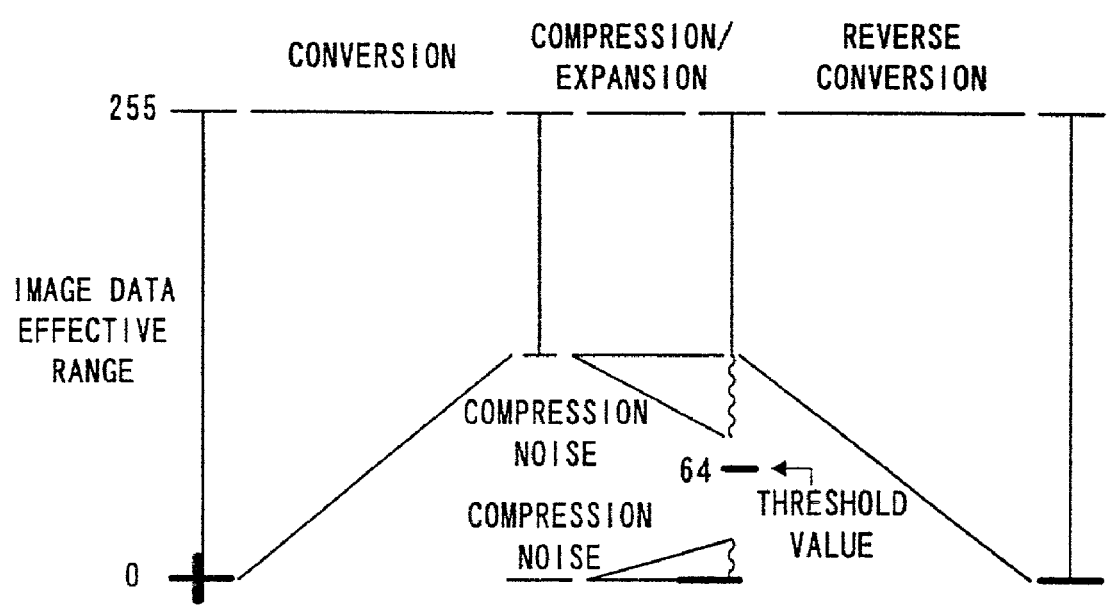
FIG. 3 is an illustrative view showing a part of operations in the FIG. 1 embodiment.

The template image data shown in FIG. 2(A) is subjected to effective-range conversion and JPEG compression as shown in FIG. 3, and then recorded in the template card. That is, 8 bits of the template image data are taken into an image processing apparatus (not shown), such as a personal computer, where the Y data constituting the template image data is converted in effective range from "0"–"255" to "128"–"255", according to Equation 6. Incidentally, the range "0"–"255" is defined as a second predetermined range, while the range "128"–"255" as a third predetermined range.

$$d2 = (d1 \div 2) + 128 \quad \text{[Equation 6]}$$

d1: the Y data before conversion on each pixel
d2: the Y data after conversion on each pixel Consequently, a converted template image is displayed on a display of the personal computer. If the operator designates an unwanted portion (a portion other than the curtain), this unwanted portion is cut away. That is, this unnecessary portion has a data value turned to "0". The personal computer compresses the template image data like this according to a JPEG format, and records the compressed data into the template card, depending upon a designation of recording by the operator.

Incidentally, the compressed data of the template image is accommodated in an image file with a file name "syn0000S.jpg" (S is an integer), while the compression data of the photographed image is to an image file having a file name "pic0000P.jpg" (P is an integer).

Figure 4:
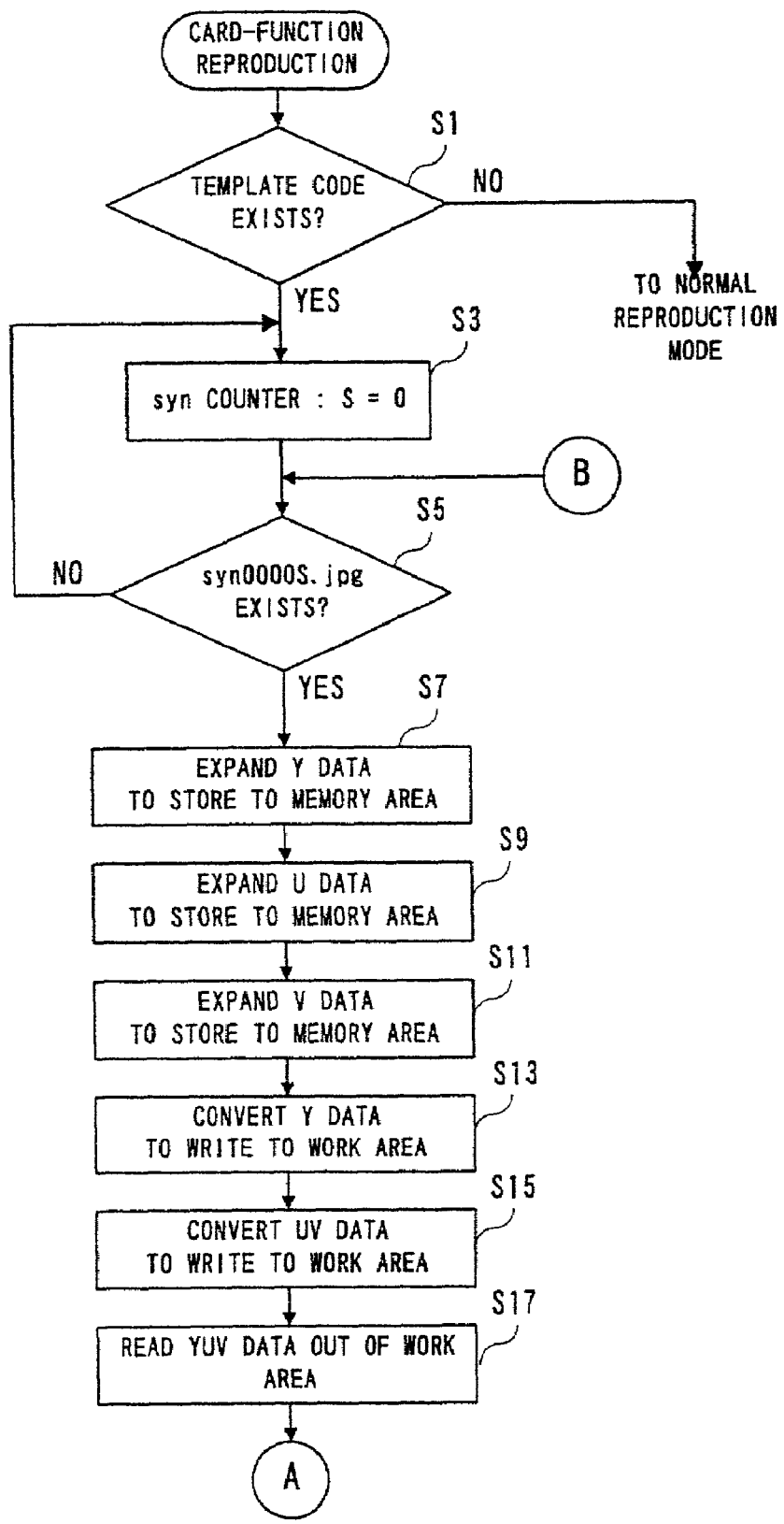
FIG. 4 is a flowchart showing a part of operations in the FIG. 1 embodiment.
Figure 5:
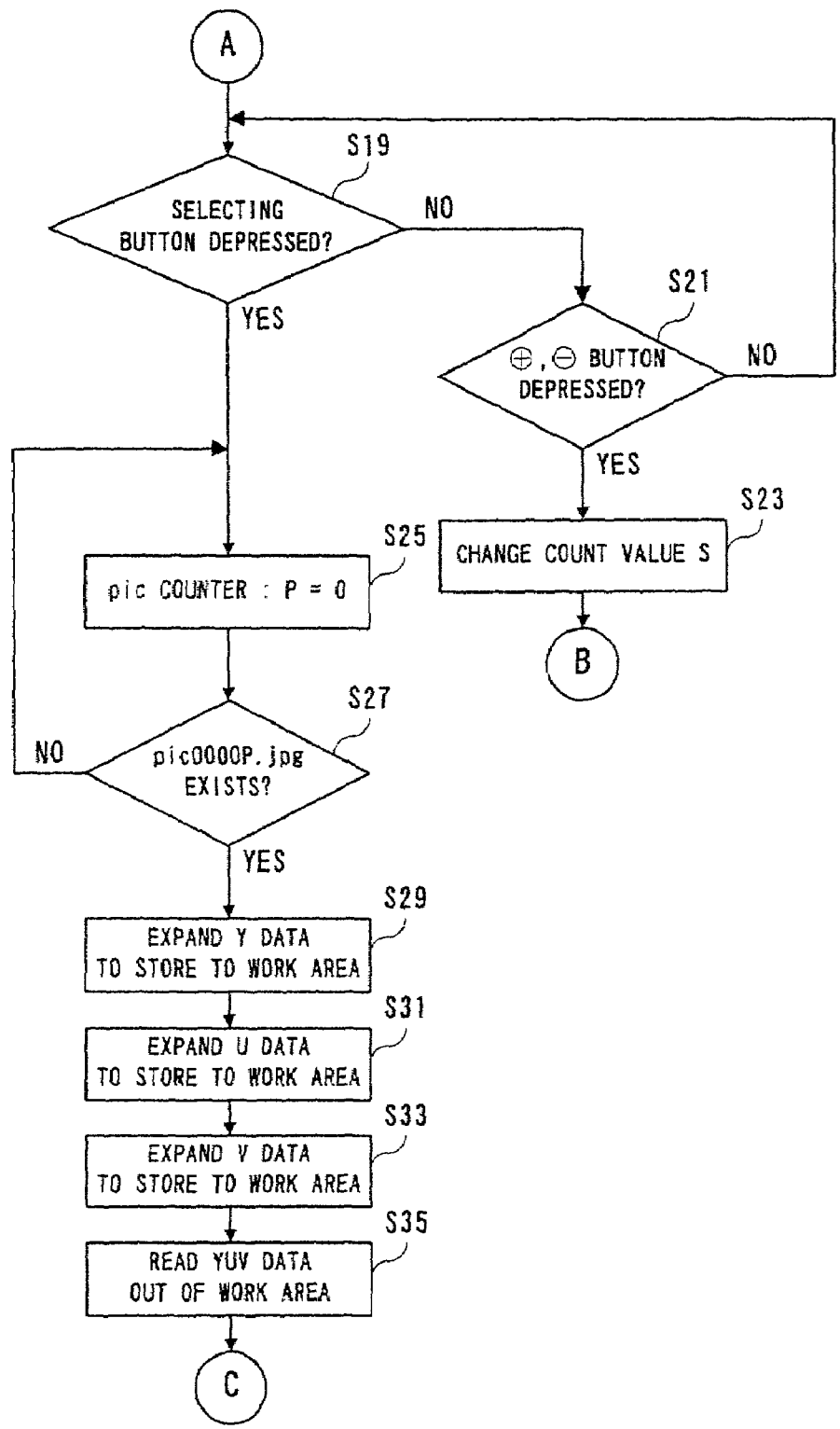
FIG. 5 is a flowchart showing another part of the operations in the FIG. 1 embodiment.
Figure 6:
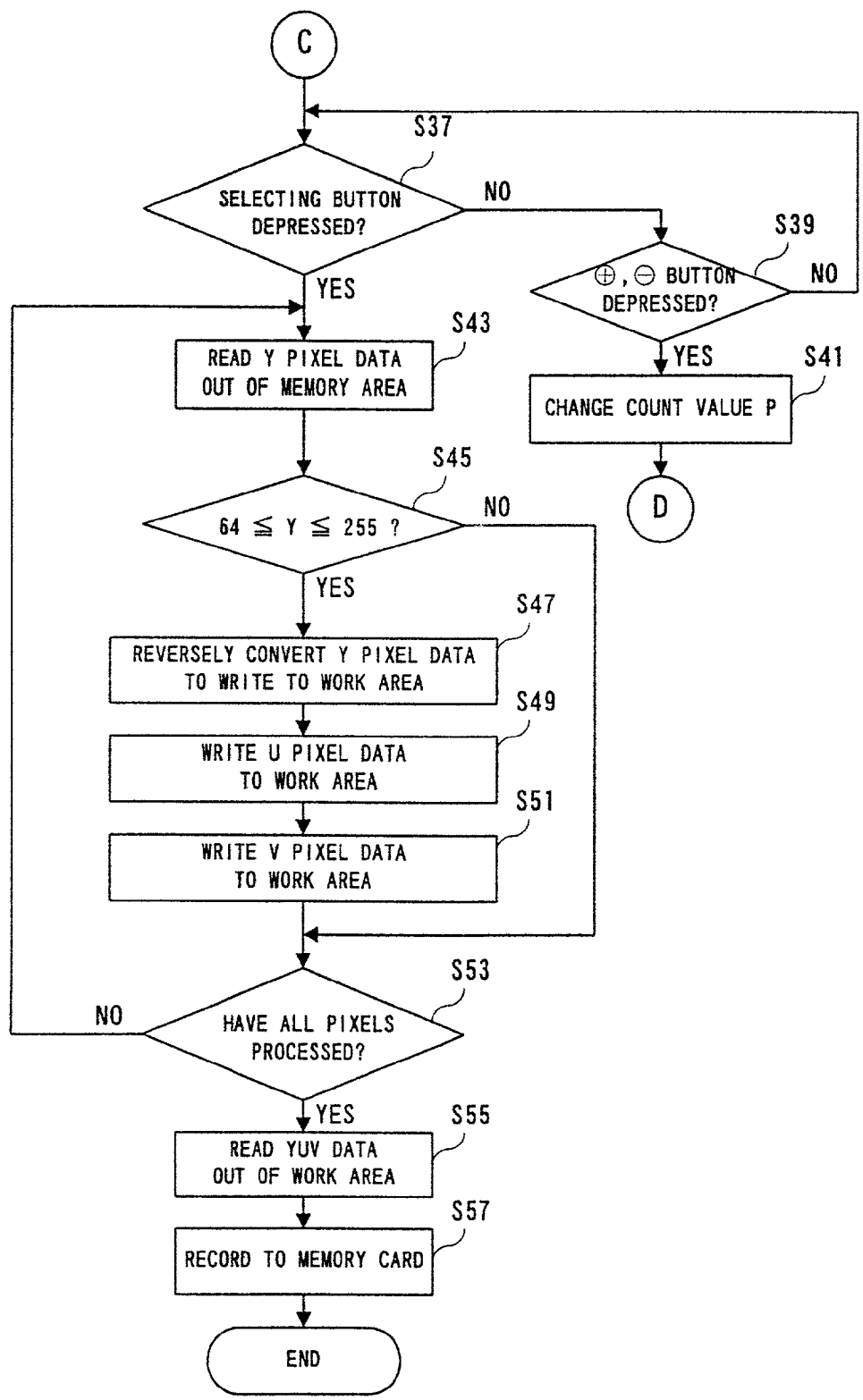
FIG. 6 is a flowchart showing still another part of the operations in the FIG. 1 embodiment.

The CPU 28 performs the above-stated operation according to a program stored in a flash memory 38. When a card-function reproducing mode is set, the operation depends upon the flowcharts shown in FIG. 4 to FIG. 6. In the card-function reproducing mode, the CPU 28 first determines, at a step S1, whether a template code exists in the memory card 46 or not. If "NO", the process returns to the normal reproducing mode. That is, when a desired memory card is not mounted, even if the operator operates the reproducing mode setting button 48, the card-function reproducing mode cannot be established. If the determination is "YES" at the step S1, the CPU 28 resets, at a step S3, a count value S of the syn counter 28a, and determines at a step S5 whether the image file "syn0000S.jpg" exists or not. If "NO", the process returns to the step S3, while if "YES", the process proceeds to steps S7–S11 to expand the compressed data in the image file to store it into the memory area 24a of the DRAM 24.

Explaining in further detail, the Y data contained in the compressed data is first expanded at the step S7, and stored in the memory area 24a. Then, the U data contained in the compressed data is expanded at a step S9, and stored in the memory area 24a. Subsequently, the V data contained in the compressed data is expanded at a step S11, and stored in the memory area 24a. The CPU 28 then reversely converts, at a step S13, an effective range of the Y data stored in the memory area 24a from "128"–"255" into "0"–"255" according to Equation 7, and writes the converted Y data into the working area 24b. That is, the CPU 28 performs on the Y data a JPEG expansion and reverse conversion in data value, as shown in FIG. 3.

$$d3 = (d2 - 128) \times 2 \quad \text{[Equation 7]}$$

d3: the Y data after reverse conversion on each pixel

The CPU 28 subsequently writes, at a step S15, the Y data and the V data as they are into the working area 24b, and reads out the Y, U and V data written in the working area 24b at a step S17. This causes a template image having a desired luminance to be outputted through the LCD 34.

The CPU 28 thereafter determines at a step S19 whether a selecting button 50 is depressed or not. If "NO", it is determined at a step S21 whether the + button 54 or− button 56 is depressed or not. If neither of the + button 54 nor the − button 56 is depressed, the process returned to the step S19, whereby a same image continues to display on the LCD 34. On the other hand, if the + button 54 or − button 56 is depressed, the CPU 28 increments or decrements the count value S of the syn counter 28a according to the button operation at a step S23, and the process returns to the step S5. This changes over an image to be displayed on the LCD 34. If the selecting button 53 is depressed by the operator, the CPU proceeds the process from the step S19 to a step S25.

In this manner, the template image data merely expanded is held in the memory area 24a, and the template image data having Y data reversely converted in effective range is held in the working area 24b.

The CPU 28 resets at the step S25 a count value P of a pic counter 28b, and then determines at a step S27 whether an image file "pic0000P.jpg" exists in the memory card 46 or not. If the determination here is "NO", the process returns to the step S25, while if "YES", the process proceeds to steps S29–S33 to write the photographed image data in the image file over the working area 24b. That is, the Y data, U data and V data constituting the photographed image data are expanded respectively at steps S29–S33, and stored in the working area 24b. The CPU 28 subsequently reads the Y, U and V data out of the working area 24b at a step S35. This causes the photographed image to be displayed on the LCD 34.

The CPU 28 thereafter determines at a step S37 whether or not the selecting button 50 is depressed. If "NO", it is determined at a step S39 whether the + button 54 or− button 56 is depressed or not. If the determination at the step S39 is "NO", the process returns to the step S37. However, if "YES", the count value P is changed by incrementing or decrementing at a step S41, and the process returns to the step S27. This changes over the photographed image to be displayed on the LCD 34.

If the operator depresses the selecting button 50, the CPU determines as "YES" at the step S37, and reads, at a step S43, the Y data on any pixel from the memory area 24a. It is determined at a step S45 whether the Y data has a data value lying in a first predetermined range, i.e. "64"≦Y≦"255" or not. Here, the first predetermined range has its lower limit taken smaller than the third predetermined range, because there may be a case that a deviation occurs in the data value after expansion due to errors caused between expansion and compression. The lower limit of the first predetermined range is set at "64", because the value "64" lies intermediate between a minimum value "128" of the third predetermined range and "0".

If "YES"at the step S45, the CPU 28 at the step S45 reversely converts the Y data according to Equation 7 as stated above, and writes the reversely-converted Y data into the working area 24b. This causes the data of a relevant pixel of the photographed image data held in the working area 24b to be updated by a reversely-converted Y data. Incidentally, the Y data value before the reverse conversion is less than "128", the data value after conversion becomes smaller than "0". In such a case, the CPU 28 forcibly renders the reversely-converted data value "0".

The CPU 28 further writes, at steps S49 and S51, the U data and the V data on a same pixel as they are to the working area 24b. Consequently, the U data and the V data of a relevant pixel of the photographed image data had in the working area 24b are updated by the template-image U data and V data. The CPU 28 thereafter advances the process to a step S53. If "NO" at the step S45, the CPU 28 proceeds the process directly to the step S53 without performing any process. That is, if the value of the Y data is not included within the first predetermined range, it is considered that the pixel has no data existing thereon or, even if existing, it would be due to a noise, thus proceeding the process directly to the step S53.

The CPU 28 determines at the step S53 whether all the pixels have completed of Y data readout or not. If "NO", the process returns to the step S43. However, if "YES", it is determined that the template image data and the photographed image data have completed of compositing. Then, at a step S55, composite image data (YUV data) is read out of the working area 24b. This causes a composite image to be outputted on the LCD 34 as shown in FIG. 2(C). The CPU 28 also compresses, at a step S57, this composite image data according to the JPEG format, and records the compressed data into the memory card 46. Then the process is ended.

According to this embodiment, a template card is prepared which is recorded with template image data that has Y data having data value converted in effective range and compressed according to a JPEG format. During reproducing the template image data from the template card, the Y data is reversely converted in effective range. Then, the template image data, on except for a pixel having a Y data value smaller than a predetermined value, is composited with photographed image data. Therefore, it is possible to prevent noises from occurring on a composite image and hence improve the image quality of a composite image.

Incidentally, the memory card may use various kinds of cards involving SSFDC (Solid-State Floppy Disc Card). Although this embodiment was explained using a complementary-colored filter having $Y_e$, $C_y$, $M_g$ and G arranged in a mosaic form, a primary-colored filter may be employed that has R, G and B arranged in a mosaic form. Further, although in this embodiment the Y data is converted in effective range, the U data or the V data may be converted in effective range. Where using a primary-colored filter, it is possible to convert the effective range of any one of the R, G and B data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image compositing method, comprising the steps of:
    (a) subjecting to an expanding process template image data created by a first converting process and a compressing process being performed in this order;
    (b) subjecting to a second converting process template image data created by the expanding process in said step (a); and
    (c) compositing template image data created by the second converting process in said step (b) with photographed image data, wherein the first converting process includes a dividing process for dividing a raw data value by a first numeral, and an adding process for adding a second numeral to a divided value obtained by the dividing process, and the second converting process includes a subtracting process for subtracting the second numeral from a data value, and a multiplying process for multiplying a subtracted value obtained by the subtracting process by the first numeral.

2. An image compositing method according to claim 1, wherein the compressing process and the expanding process are performed in accordance with a JPEG format.

3. An image compositing method according to claim 1, wherein the template image data includes luminance data, and the luminance data is subjected to the first converting process.

4. A digital camera, comprising:
   an expander for subjecting to an expanding process template image data created by a first converting process and a compressing process being performed in this order;
   a processor for subjecting to a second converting process template image data created by the expanding process of said expander; and
   a compositor for compositing template image data created by the second converting process of said processor with photographed image data, wherein the first converting process is a process of dividing a raw data value by a first numeral and adding a second numeral to the divided value, and the second converting process is a process of subtracting the second numeral from a data value and multiplying the subtracted value by the first numeral.

5. A digital camera according to claim 4, wherein said second converting process further includes a changing process for changing a subtracted value less than zero to zero.

6. A digital camera according to claim 4, wherein the compressing process and the expanding process are performed in accordance with a JPEG format.

7. A digital camera according to claim 4, wherein the template image data includes luminance data which is subjected to the first converting process.

8. A digital camera according to claim 4, wherein said processor includes a comparer for comparing a value of each pixel data forming the template image data with a threshold value, and a converting executor for subjecting to the second converting process pixel data having a data value which is equal to or more than the threshold value.

* * * * *